United States Patent [19]

Wormser et al.

[11] 4,135,885

[45] Jan. 23, 1979

[54] BURNING AND DESULFURIZING COAL

[75] Inventors: Alex F. Wormser, Marblehead; Stephen P. Perkins, Beverly, both of Mass.

[73] Assignee: Wormser Engineering, Inc., Lynn, Mass.

[21] Appl. No.: 756,265

[22] Filed: Jan. 3, 1977

[51] Int. Cl.$^2$ .................... C01B 17/02; C01B 17/06; C01J 3/54
[52] U.S. Cl. .................... 422/142; 201/17; 201/31; 423/244; 48/77; 48/99; 422/143; 422/145; 422/173; 422/176; 422/193
[58] Field of Search .................... 110/28 J; 122/40; 23/284, 288 S; 201/17, 31; 423/244; 48/77, 99, 210

[56] References Cited

U.S. PATENT DOCUMENTS

| 2,967,878 | 1/1961 | Fenske et al. | 23/288 S |
|---|---|---|---|
| 3,481,834 | 12/1969 | Squires | 201/17 |
| 3,597,327 | 8/1971 | Squires | 48/77 X |
| 3,625,164 | 12/1971 | Spector et al. | 122/4 X |
| 3,969,089 | 7/1976 | Moss et al. | 423/244 X |
| 3,971,635 | 7/1976 | Matthews | 48/197 R X |
| 3,971,638 | 7/1976 | Matthews | 48/206 X |
| 3,996,335 | 12/1976 | Wolk et al. | 48/206 X |
| 4,017,585 | 4/1977 | Anguine et al. | 23/284 X |
| 4,032,305 | 6/1977 | Squires | 201/31 |

FOREIGN PATENT DOCUMENTS 1183937 3/1970 United Kingdom.

Primary Examiner—Morris O. Wolk
Assistant Examiner—Michael S. Marcus

[57] ABSTRACT

A chemical reactor with a first upstream fluid bed which primarily burns coal and a second downstream fluid bed which primarily desulfurizes.

5 Claims, 2 Drawing Figures

BURNING AND DESULFURIZING COAL

FIELD OF THE INVENTION

This invention relates to chemical processing such as burning and desulfurizing coal.

BACKGROUND OF THE INVENTION

Deep-bed fluid bed combustors which provide good desulfurization of coal have been known; however, these devices have the drawbacks both of requiring great freeboard (above the bed) height and of blowing out unburned bits. Such combustors are discussed in H. Nack et al., "Fluidized-Bed Combustion Review," Vol. II, at pp. 346–47 of *Fluidization Technology* (Proceedings of the International Fluidization Conference at Asitomar, California, June 15–20, 1975), Hemisphere Publishing Co., Washington, D.C., 1976.

Also known have been shallow-bed fluidized bed coal combustors in which pieces of coal burn while floating (in effect) on a shallow bed of (e.g.) sand; these devices give good combustion and low freeboard height, but provide poor desulfurization. They are described in "Fluidized Combustion," Proceedings, Vol. 1, p. B3-2, Symposium Series No. 1 (1975), published by The Institute of Fuel, London.

Shallow-bed combustors use much coarser coal than do deep-bed combustors.

SUMMARY OF THE INVENTION

The invention features a plurality of fluidized beds in series, with one fluidized bed performing a function different from and complementary of that performed by the other; somewhat less generically stated, it features a coal-burning bed downstream of which is a desulfurizing bed. In preferred embodiments the coal-burning bed and the desulfurizing bed are of intermediate depth (4 inches to 10 inches); cool air introduction means are provided to permit selective cooling of the desulfurizer bed and to burn off volatiles during turndown; and sorbent is provided both as coal carrier in the combustor and for desulfurization in both beds, with coarser sorbent selected for the upper bed.

The invention has advantages of (e.g.) permitting economical and clean (to E.P.A. standards) burning of even high-sulfur coal, in a very wide range of sizes and capacities with such a small requirement for freeboard height that existing boilers designed for other fuels can readily be converted to coal. Indeed, the invention promises to be the lowest cost method of burning high-sulfur coal cleanly in an existing boiler designed for oil or gas, giving increased efficiency of typically 10%, increased capacity of ⅓, or some combination of improved efficiency and capacity. It can as readily be incorporated into new boiler designs, and is potentially adaptable for use in large, high velocity coal-burning utility stations. It also burns coal fines, modulates instantly (to avoid temperature overshoots), has fully automatic capability, avoids clinkering (heat transfer keeps combustor bed to 1600° F.), can provide from (e.g.) 100,000 to 250 million BTU/hour, and needs no auxiliary carbon burn-up cell to burn char blowing out of the combustor. Desulfurization is more complete, although using less limestone. These advantages exist with indirect fired furnaces as well as boilers.

PREFERRED EMBODIMENT OF THE INVENTION

We turn now to the presently preferred embodiment of the invention.

DESCRIPTION OF THE PREFERRED EMBODIMENT

Figure 1:
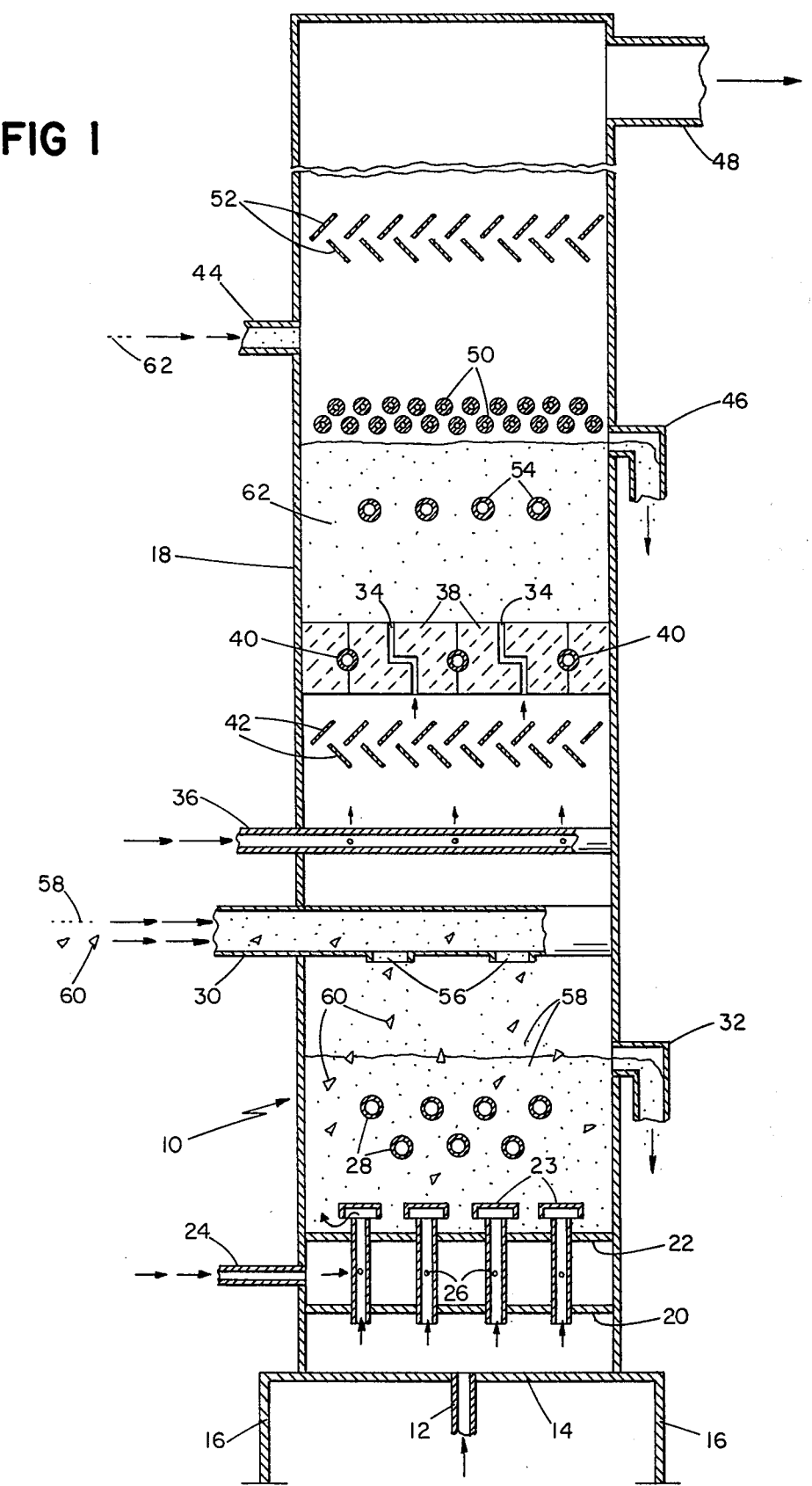
FIG. 1 is a diagrammatic view, mainly in section, of the presently preferred embodiment of the invention.

There is shown in FIG. 1, very diagrammatically, a two-bed, both fluidized, combustor-desulfurizer, indicated generally at 10. Air inlet 12 extends through bottom 14 of the device, which stands on legs 16. Above bottom 14 is housing 18, across which extend bottom plates 20 and 22, through both of which extend a multiplicity of caps 23. Natural gas inlet 24 extends through housing 18 into the plenum formed between plates 20 and 22. Holes 26 permit natural gas to be drawn into caps 23.

Extending back and forth through the combustor are water pipes 28. Above it is limestone and coal feed pipe 30, which drops fresh limestone and then drops coal to be supported by the limestone above plate 22. Spent (calcined and sulfated) limestone and some of the ash are removed by outlet pipe 32.

Products of combustion in the combustor then pass through stepped holes 34 (secondary air may be selectively introduced through apertured pipe 36) formed by pairs of semicylindrical channels in adjacent stepped high-alumina refractory bricks 38. Bricks 38 are supported by water-cooled cold-rolled steel pipes 40 running between adjacent bricks. Two rows of oppositely angled deflector strips 42, extending in their longitudinal dimension the width of the combustor and held at their ends by horizontal slats (not shown), deflect limestone that would otherwise be flung upward against the lower openings of holes 34. The total cross-sectional area of all holes 34 is chosen so as to provide a pressure drop thereacross at maximum flow of at least one-third the bed weight per unit area; individual holes 34 (0.187 inch in diameter) are large enough to prevent clogging by entrained particles.

Limestone feed pipe 44 drops limestone into the active part of the desulfurizer, above bricks 38 and surrounded by wall 18. Spent limestone is removed by outlet pipe 46. Hot desulfurized gases leave through pipe 48. Two rows of cylinders 50 positioned just above the top of the desulfurizer bed act to break up waves that might form in the bed. Two rows of deflector strips 52, just like deflector strips 42, prevent limestone from being hurled out through pipe 48. Extending back and forth through the desulfurizer are water pipes 54.

Dimensions and other specifications in the embodiment shown have been selected to give an energy input of 450,000 BTU/hour/sq.ft., and are as follows. The lower bed is 8 inches deep (when settled) and uses minus 20 plus 30 mesh limestone. The upper bed is also 8 inches deep, and uses coarser (minus 10 plus 20 mesh) limestone. The distance from the top of plate 22 to the bottom of bricks 38 is 18 inches, giving a freeboard height of about 10 inches. Feed pipe 30 is 3 inches in diameter. Bricks 38 are 3 inches high. Deflector strips 42 and 52 are 1 inch wide and ⅛ inch thick metal. Wave breaker cylinders 50 are ⅜ inch in diameter and triangularly spaced on 1⅛ inch centers for ⅜ inch openings therebetween. Although only a few of each are shown in the drawing, which is quite schematic, there are numerous caps 23, holes 34, and limestone and coal delivery holes 56 in pipe 30 (one of such holes for each 10 to 30 square feet of column area). The horizontal area inside wall 18 is 200 square feet, for 90,000,000 BTU/hour energy input; of course, the energy output requirements of a particular boiler will in large part determine the area. The turndown ratio is 8 to 1. Pipes 28 and 54 are of 304 stainless steel, and the baffles (i.e., strips 42 and 52 and cylinders 50), coal and limestone feed pipe 30, pipe 36, and housing 18 of 316 stainless steel.

OPERATION

Limestone is supplied through pipes 30 and 44 to fill both the lower and upper beds to a depth of 8 inches.

Start-up of a cold combustor requires preheating as follows. Air entering through inlet 12 mixes in caps 23 with natural gas entering through inlet 24; the mixture passes through limestone 58 and is ignited (pilot not shown) and burns above the limestone bed, gradually penetrating downwards and preheating the lower bed, hot products of combustion also rising to heat the upper bed.

When sufficient preheating has occurred, the supply of natural gas is shut off, lumps of stoker coal (minus ⅜ inch plus zero) enter through pipe 30, and air continues to enter through inlet 12. Pieces of coal 60 mix with fluidized limestone 58 and burn, the products of combustion being partially desulfurized. Combustion gases then pass through holes 34, which are kept hot by bricks 38 to permit burning off of condensed coal tars and thereby prevent tar-sorbent plug or "beehive" formations at the openings of the holes, to fluidize limestone 62, which further desulfurizes the gases and entraps particulate matter escaping the lower bed. Coal fines that may have escaped the combustor unburned will be burned in the desulfurizer, which thus acts as an afterburner as well. Typically one-half to two-thirds of the heat produced in the combustor is ordinarily transferred to water in pipes 28 and 54; the rest is transferred downstream of pipe 48 to water in pipes not shown. Pipes 28 also cool the combustor bed to 1600° F., thus avoiding clinkering, overheating of the upper grate and volatilization of corrosive alkali-sulfur compounds, which instead remain with the ash. Most ash leaves through pipe 48 as flyash.

Deflector strips 42 prevent build-up of limestone and coal tar plugs at the openings of holes 34 during startup. The stepped path taken by holes 34 prevents limestone from the upper bed from dropping into the lower bed during combustor shutdown.

In normal operation, the lower bed bubbles violently, for good mixing and to prevent agglutination of caking coals, while the upper bed is much quieter, appearing to jiggle at the surface rather than bubble and thus minimizing elutriation of particulates. The effect of having the desulfurizer bed downstream of the combustor bed is to expose all the gases to be desulfurized to a desulfurizer.

Combustor turndown is achieved as follows. If, for example, one wants to cut energy output from full to one-eighth of full, the combustor is cycled on and off, with an appropriate cycle being 10 seconds on and 70 seconds off. In general, such a short on-off cycle will prevent the combustor from cooling below the reignition point. Turning the combustor off is achieved simply by shutting off the coal supply through pipe 30 and the air supply through inlet 12. Because coal already in the combustor at turnoff will in the combustor's hot, oxygen-deficient atmosphere give off environmentally objectionable volatiles (assuming the coal contains a significant amount of volatiles, unlike (e.g.) anthracite), secondary air continues to be supplied through pipe 36 until the volatiles have been burned off. The secondary air, as do water pipes 54, also serves to cool the upper bed, thereby permitting independent temperature control of the upper and lower beds and keeping the upper bed at the optimum desulfurization temperature (1600° ± 30° F.).

Other Embodiments and Variations

Instead of using the arrangement of a pipe with many delivery holes, one can deliver coal by a smaller number of spreaders similar to those of a spreader stoker.

Figure 2:
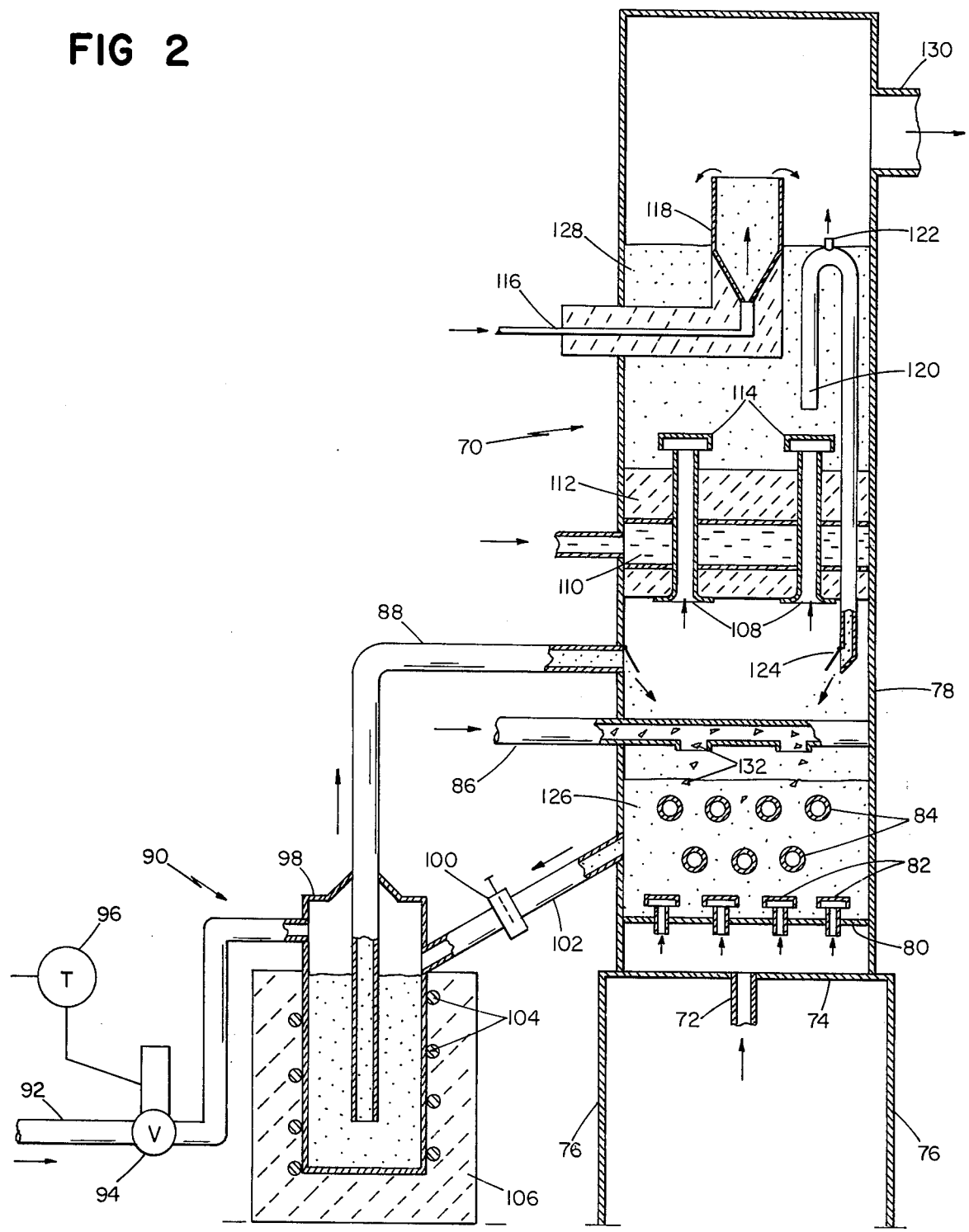
FIG. 2 is a diagrammatic view, mainly in section, of a modified embodiment of the invention.

FIG. 2 shows very diagrammatically a modified two-bed, both fluidized, combustor-disulfurizer indicated generally at 70. Air inlet 72 extends through bottom 74 of the device, which stands on legs 76. Above bottom 74 is housing 78, across which extends bottom plate 80, through which extend a multiplicity of caps 82. Extending back and forth through the combustor are water pipes 84.

Above it is coal feed pipe 86, which drops coal 132 to be supported by limestone above plate 80.

The limestone enters through outlet pipe 88 of the limestone feeder-recirculator indicated generally at 90. Air pressure pipe 92 is valved at solenoid valve 94, directed by pressure differential gauge 96. The pipe 92 enters the top of limestone bucket 98, from which limestone is driven by air pressure through pipe 88 into the combustor. For combustor turndown, one turns off the air and the coal and activates dump valve 100 in line 102 to remove all the limestone in the combustor. The limestone is stored in bucket 98 surrounded by heater 104 and insulation 106 to keep the limestone hot until the combustor is turned on again, at which time the limestone is driven into the combustor again through pipe 88. The combustor can be turned off for far longer periods in proportion to the on-time than in the embodiment of FIG. 1, because heat losses from the limestone are minimized by heater 104 and insulation 106 while the combustor is shut down. Limestone in the combustor is preheated in bucket 98 rather than in the combustor itself. The result is that a lower capacity preheating system (here, heater 104) is required than in the embodiment of FIG. 1.

Products of combustion in the combustor then pass through pipes 108 (cooling air is selectively introduced as in FIG. 1, the air pipe not shown here) set through cooling water manifold 110 and refractory ceramic 112 into the fluidized bed desulfurizer thereover. Refractory ceramic 112 keeps the lower openings of pipes 108 hot enough to prevent formation of tar plugs over them. Caps 114 prevent dropping of limestone through pipes 108 during turnoff.

Limestone carried by air and $CO_2$ enters through pipe 116 where it is heated, and continues upwardly through container 118, from which it falls into the active part of the desulfurizer, surrounded by wall 78. This heating of the limestone in $CO_2$ makes it more reactive than if it were simply dumped into the desulfurizer. The partly spent limestone is recirculated to the combustor from the bottom of the desulfurizer through standpipe 120, relieved at 122, and flapper valve 124. Limestone in the combustor is indicated at 126, and limestone in the desulfurizer at 128.

Hot desulfurized gases leave through pipe 130. Baffles (not shown) are provided as in FIG. 1.

When noncaking coal is used, one can operate limestone feeder-recirculator 90 to lower the bed depth while the combustor remains in operation (without removing all of the limestone) so as to expose the water pipes 84 and thereby cut heat transfer. Such a device fulfills the turndown function that the on-off cycling already discussed with respect to FIGS. 1 and 2 provides.

Regarding still other variations, freeboard height above the desulfurizer bed can be increased, if space allows, preferably with one foot added for every 20 million BTU/hour of heat release.

One variation in operation is to run the combustor bed of FIGS. 1 or 2 at a much hotter temperature (1900° F.) in an oxygen-deficient atmosphere and to run the desulfurizer at 1600° F. with 3% excess air. When the device is so operated and is used as the char burner in U.S. patent application Ser. No. 604,923, entitled "Coal Burning Arrangement", filed Aug. 15, 1975 by Alex F. Wormser, pollutant calcium sulfide solids are efficiently converted to lime and then to inert calcium sulfate. Further information regarding the effect of running the combustor under these hotter oxygen-deficient conditions is found in Moss U.S. Pat. No. 3,870,480, hereby incorporated herein by reference.

Finally, additional beds can be added. A three-bed arrangement in which the first bed acts as a combustor, the middle bed as an ash agglomerator, and the upper bed as the desulfurizer appears promising.

Other embodiments of the invention will occur to those skilled in the art.

What is claimed is:

1. Apparatus for burning and desulfurizing coal which comprises
    vessel means providing
        a first fluid bed zone for combustion therein of coal and
        a second fluid bed zone downstream of said first fluid bed zone for desulfurization therein of gaseous products of said combustion;
    means for feeding coal, including
        coal distribution means extending horizontally in said vessel for distribution of said coal over the area of said first fluid bed zone,
        coal inlet means connected to supply said coal distribution means, and
    means for introducing air, including
        fluidizing air distribution means within said vessel and extending horizontally across the upstream end of said first fluid bed zone to fluidize therein said coal and an incombustible particulate, and
        air inlet means connected to said fluidizing air distribution means to supply said air;
    support means extending within the vessel horizontally and cooperating with said air inlet means to define the upstream end of said first fluid bed zone, and hold thereover a fluidized bed mixture of said coal and said particulate for burning of said coal in said air while in said mixture;
    first outlet means from said first fluidized bed zone for removal therefrom of ash produced in said burning;
    heat transfer conduit means positioned in said first fluidized bed zone above said fluidizing air distribution means for removing from said first fluidized bed zone heat energy produced in said burning;
    fluidizing combustion gas distribution means extending horizontally across the upstream end of said second fluid bed zone;
    support means extending within the vessel horizontally and cooperating with said combustion gas distribution means to define the upstream end of said second fluid bed zone, and hold thereover a fluidized bed of sorbent for desulfurization thereby of said combustion gas during passage thereof therethrough;
    conduit means from the downstream end of said first fluid bed zone to supply combustion gas to said fluidizing combustion gas distribution means;
    sorbent inlet means for delivery therethrough of sorbent to said second fluidized bed zone;
    second outlet means for discharge from said second fluidized bed zone of spent sorbent; and a
    third outlet means downstream of said second fluidized bed zone for discharge through said third outlet means of said combustion gas.

2. The apparatus of claim 1 in which each said fluid bed zone is of intermediate depth.

3. The apparatus of claim 1 which includes cooling gas means for introduction of cooling gas just upstream of said second fluid bed zone.

4. The apparatus of claim 1 in which said vessel means is a single vertically extending housing.

5. The apparatus of claim 1 in which said fluidized combustion gas distribution means includes stepped holes therethrough for passage of said combustion gas therethrough.

* * * * *